June 20, 1967     I. T. BARRIE     3,327,050

CABLES WITH 4-METHYL PENTENE-1 PRIMARY INSULATION

Filed July 12, 1965     2 Sheets-Sheet 1

INVENTOR
IAN TORRANCE BARRIE

By Cushman, Darby & Cushman
ATTORNEYS

United States Patent Office 3,327,050
Patented June 20, 1967

3,327,050
CABLES WITH 4-METHYL PENTENE-1 PRIMARY INSULATION
Ian Torrance Barrie, Amwell, England, assignor to Imperial Chemical Industries Limited, London, England, a corporation of Great Britain
Filed July 12, 1965, Ser. No. 471,125
Claims priority, application Great Britain, July 29, 1964, 30,118/64
11 Claims. (Cl. 174—107)

This invention relates to cables.

According to the present invention we provide a telecommunication cable in which the primary insulation comprises 4-methyl pentene-1 polymer having an ash content of less than 0.02% by weight. Preferably the 4-methyl pentene-1 polymer is a copolymer of 4-methyl pentene-1 with a minor proportion, preferably from 8 to 30% by weight, of a linear 1-olefine having up to 18, and preferably at least 5, carbon atoms in the molecule.

A specific embodiment of the invention will now be described with reference to FIGURE 1 of the drawings, which is a cross-section of a cable according to our invention.

Figure 1:
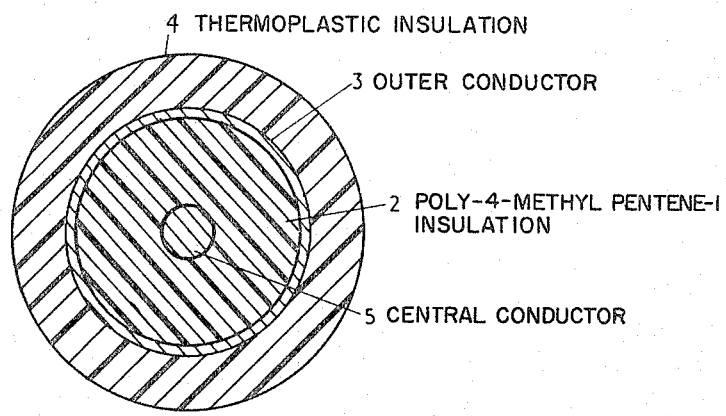

In FIGURE 1, the central conductor 5 is of copper, and is surrounded by primary insulation 2 which consists of an unstabilised copolymer of 4-methyl pentene-1 containing 12% by weight of hexene-1 monomer units and less than 0.01% by weight ash content, prepared by the process of our cognate copending British Patent No. 1,001,801. This in turn is surrounded by the outer conductor 3 which consists of lapped copper foil; the outside layer of the cable is a polyvinyl chloride sheath 4.

Cables according to our invention may be either coaxial (as in the above described specific embodiment) or symmetrical, and obviously many variations in the mode of construction are possible; e.g. in the form of the conductors used and in armouring. For example, in the embodiment described, the outer conductor could be lapped aluminium foil, or tinned copper braiding; the outside sheath 4 could be of any suitable thermoplastic material e.g., polythene or polypropylene. Generally the cables will be made by extrusion.

Figure 2:
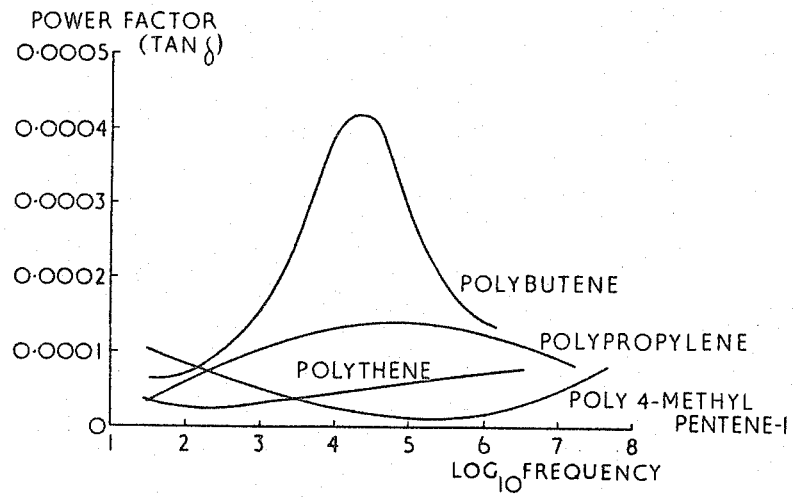

4-methyl pentene-1 polymers have power factor values at about 20° C. in the audio and radio frequency range which are extremely low. Other materials which have been used or proposed for use as insulants in telecommunication cables include polyethylene, polypropylene and polybutene; none of these has such a low power factor as poly-4-methyl pentene-1 in the temperature/frequency region of technological interest. This is illustrated in FIGURE 2 of the accompanying drawings. The only material which we know of at present having a comparable or lower power factor in this region is polytetrafluoroethylene; this material is practicable for use as a cable insulant only in specialised applications because of its high cost and the difficulties in shaping it.

Figure 3:
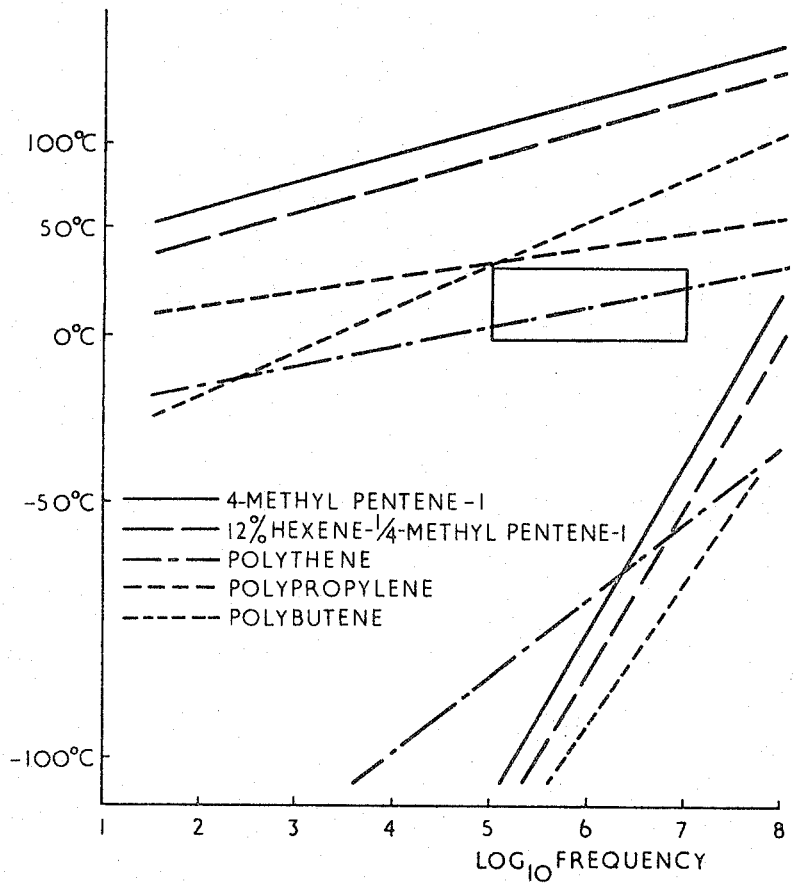

In most polyolefines two dominant dielectric relaxation mechanisms control the changes of power factor values with temperature and frequency. These two mechanisms cause two peaks in the values of the power factor, one of which is usually found at about −100° C. and the other above 0° C. To make the most efficient use of the potential low power factor values of a cable dielectric, is is desirable that the temperature region 0 to 30° C. should fall in the valley between these two power factor peaks, measured in the $10^5$–$10^7$ cycles per second frequency range. This is found to occur with 4-methyl pentene-1 polymer, but other polyolefines that have been proposed as cable dielectrics have power factor peaks in this region or very close to it. This is illustrated in FIGURE 3 of the accompanying drawings, in which the loci of the two dielectric loss maxima are shown plotted against functions of frequency and temperature for poly-4-methyl pentene-1, polythene, polybutene-1, polypropylene and a copolymer of 4-methyl pentene-1 containing 12% by weight of hexene-1. The results for 4-methyl pentene-1 polymers given in FIGURES 2 and 3 of the drawings were obtained from measurements made on unstabilised sheet compression moulded in vacuo at 300° C.

4-methyl pentene-1 polymers also have very low density (∼0.83 gm./cc.) and hence low permittivity; this factor contributes greatly to the low attenuation characteristics which can be achieved. Also they are generally transparent which allows detection of core faults and imperfections (e.g. core eccentricity) in finished cables.

Methods for producing poly-4-methyl pentene-1 homopolymer and poly-4-methyl pentene-1 copolymers having the requisite low ash contents are described in British Patent No. 942,297 and in British Patent No. 1,001,801. Ash contents above 0.02% can cause variability in the power factor to an undesirable extent. Copolymers of 4-methyl pentene-1 with minor amounts of linear 1-olefines, e.g. pentene-1, hexene-1, octene-1 and decene-1 or mixtures of these have marginally higher power factor values than 4-methyl pentene-1 homopolymer, but compensate for this by their improved flexibility, a property desirable in many cable applications. Such copolymers increase in flexibility with increase in the proportion of linear 1-olefine they contain, and a wide range of degrees of flexibility is thus available. Polymers containing from 8 to 30% by weight of linear 1-olefine have particularly useful flexibility.

We prefer to use in our cables 4-methyl pentene-1 polymer which contains antioxidant to protect the polymer against oxidative degradation. A useful level of antioxidant is generally from 0.05 to 0.5% by weight of the polymer. The presence of an antioxidant in a sufficiently high concentration to provide effective protection may cause an increase in the power factor or colouration or staining of the polymer. We prefer to use either a condensate of three molar proportions of 3-methyl-6-tertiary-butyl-phenol with one molecule of crotonaldehyde, or 1,3,5,trimethyl - 2,4,6-tri(3,5-di-tertiary butyl 4-hydroxybenzyl) benzene which are commercially available as "Topanol CA" and "Ionox 330" respectively; at a level of 0.1% by weight both of these materials give effective protection without colouration or staining or significantly increasing the power factor of the polymer in the area of technological importance. It may also be desirable to incorporate a melt stabiliser in the polymer to protect it during the processing by which the cable is made. A useful level of melt stabiliser is generally from 0.05 to 0.5% by weight of the polymer. We prefer to use dihydroanthracene, which is effective at a level of about 0.1%, does not of itself discolour or significantly increase the power factor of the polymer in the area of technological importance and undergoes no deleterious reaction with either of our preferred antioxidants.

Our invention is particularly useful as applied to submarine cables, since the lower power factor and permittivity of the dielectric produce decreased cable attenuation values. This enables fewer repeater units to be used; or alternatively allows the upper transmission frequency limit of the cable to be raised, so that it can carry more information.

I claim:
1. A telecommunication cable comprising a central conductor surrounded by a layer of primary insulation, wherein said primary insulation is a copolymer of 4-methyl pentene-1 with a minor proportion by weight of a linear 1-olefine having from 5–18 carbon atoms, wherein said copolymer has an ash content of less than 0.02% by weight.

2. A cable as claimed in claim 1 in which the proportion by weight of linear 1-olefine in the copolymer is from 8 to 30%.

3. A cable as claimed in claim 2 which is symmetrical.

4. A cable as claimed in claim 2 which is coaxial.

5. A cable as claimed in claim 4 comprising a central conductor of copper surrounded by 4-methyl pentene-1 polymer, an outer conductor of lapped foil and an outside sheath of thermoplastic material.

6. A cable as claimed in claim 1 in which the 4-methyl pentene-1 polymer contains an antioxidant.

7. A cable as claimed in claim 6 in which the concentration of the antioxidant in the 4-methyl pentene-1 polymer is from 0.05 to 0.5% by weight.

8. A cable as claimed in claim 7 in which the antioxidant is a condensate of three molar proportions of 3-methyl-6-tertiary butyl phenol with one molar proportion of crotonaldehyde or 1,3,5-trimethyl-2,4,6-tri(3,5-di-tertiarybutyl-4-hydroxybenzyl) benzene.

9. A cable as claimed in claim 1 wherein said copolymer contains a melt stabilizer.

10. A cable as claimed in claim 9 wherein the 4-methyl pentene-1 polymer contains from 0.05 to 0.5% by weight of a melt stabiliser.

11. A cable as claimed in claim 10 wherein the melt stabiliser is dihydroanthracene.

References Cited
FOREIGN PATENTS 942,297   11/1963   Great Britain.

OTHER REFERENCES

Dupont Plastics bulletin, 1945, vol. 9, page 109.

LEWIS H. MYERS, *Primary Examiner.*

H. HUBERFELD, *Assistant Examiner.*